Patented Feb. 18, 1930

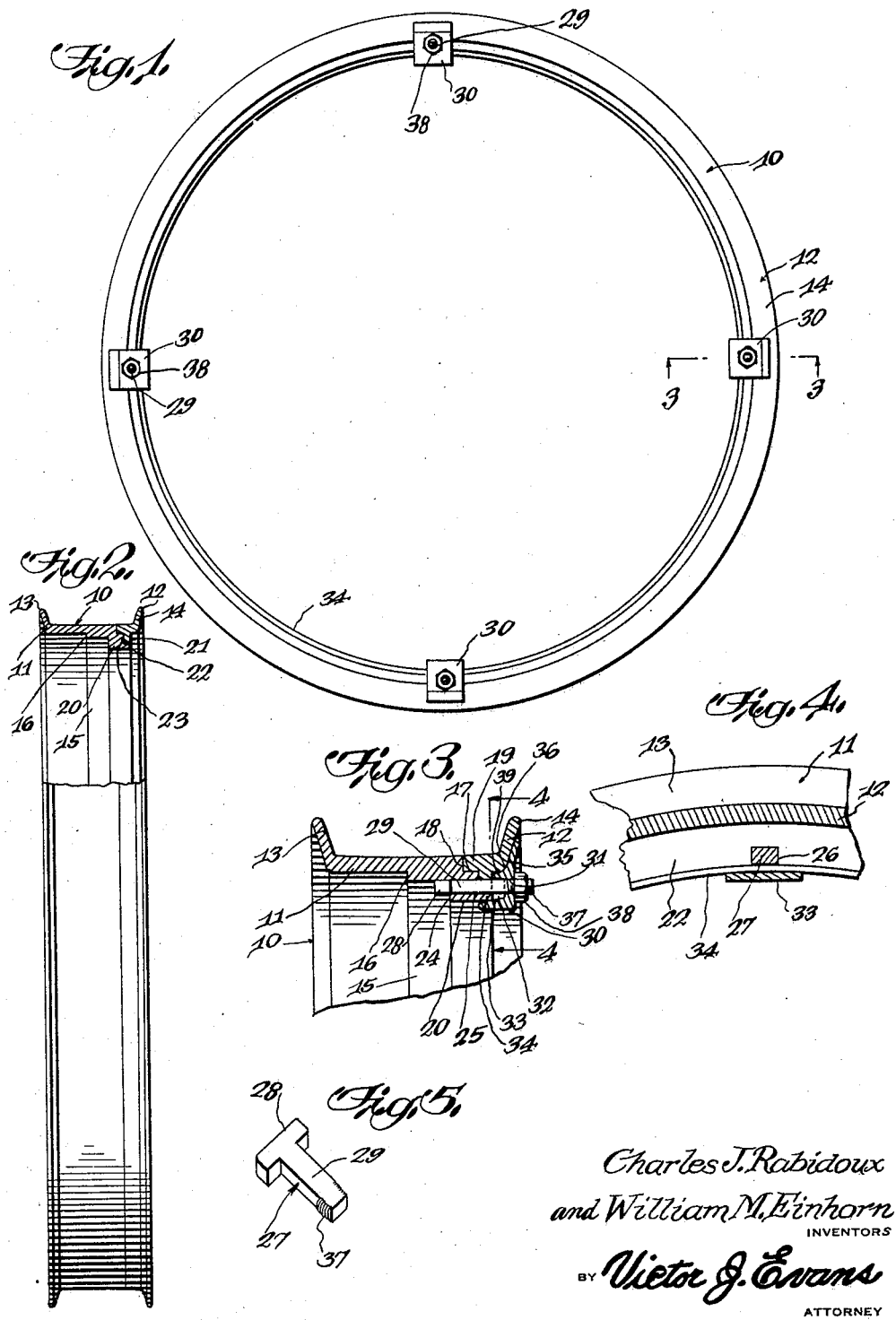

1,747,949

UNITED STATES PATENT OFFICE

CHARLES J. RABIDOUX AND WILLIAM M. EINHORN, OF BLUE ISLAND, ILLINOIS

TIRE RIM

Application filed May 16, 1928. Serial No. 278,324.

This invention relates to certain novel improvements in tire rims and is particularly adapted to such constructions as are employed in connection with the wheels of automotive vehicles and the like and the invention has for its principal object the provision of an improved construction of this character which will be highly efficient in use and economical in manufacture.

The salient object of our invention is to provide a tire rim which will be arranged so that it may be detachably mounted on the felly of a wheel in any approved or desired manner.

Another object of the invention is to provide a rim construction adapted to receive a pneumatic tire which will be so arranged that it will be separable to facilitate tire installation and removal, and to provide securing means for the separable portions arranged to produce a wedging action.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a rim constructed in accordance with our invention;

Fig. 2 is an edge elevational view, partly in section, of the rim depicted in Fig. 1;

Fig. 3 is a sectional detail view, drawn to an enlarged scale, taken substantially on the line 3—3 on Fig. 1;

Fig. 4 is a view taken substantially on the line 4—4 on Fig. 3; and

Fig. 5 is a perspective detail view of a bolt employed in the device.

In the drawing wherein we have illustrated the preferred embodiment of our invention, 10 indicates our improved rim which is preferably formed of two sections 11 and 12. The section 11 includes a tire flange 13 and the section 12 includes a tire flange 14. The foregoing construction is substantially similar to the arrangement of a rim which is formed in one piece, it being understood that a pneumatic tire is adapted to be retained between the flanges 13 and 14.

The embodiment of the invention illustrated is intended to be mounted on the felly of a wheel. The section 11 is preferably arranged on the inner side of the periphery of the felly while the section 12 is preferably arranged on the outer side of the periphery of the felly. These sections 11 and 12 are secured on the felly in any desired manner after they have previously been secured together in a manner to be set forth hereinafter.

The surface of the section 11 disposed toward the tire, and adapted to engage the section 12, is recessed as indicated at 17 to provide a shoulder 18. The section 12 includes a lip portion 19 that is disposed in the recessed portion 17 to abut the shoulder 18. The portion adjacent the recessed portion 17 is enlarged as indicated at 20 and extends radially inwardly away from this recessed portion 17 and has a recessed portion 21 provided therein onto which the shoulder 22 on the section 12 is fitted. It will thus be seen that the portion of the section 11 disposed toward the section 12 is arranged to provide a step-like surface including the shoulder 18, the bottom of the recessed portion 17, shoulder 23, and the bottom of the recessed portion 21, the shoulder 23 being provided by said recessed portion 21 and being adapted to be engaged with the shoulder 22 of section 12. The section 12 has a face thereof disposed toward the section 11 arranged to comprise a step formation which will co-operate with the step formation on the section 11 and these portions tend to securely inter-fit the sections 11 and 12.

A flange 16 is provided on the inner surface of the section 11 and it has also been pointed out that an inwardly protruding portion 20 is provided. A shoulder 24 is provided on the portion 20. At suitable intervals around the diameter of the rim, openings such as 25 are provided in the portion 20 which open into the shoulder 24. The extending portion 22 is cut away at corresponding intervals to provide recesses adapted to register with the openings 25 and these recesses are indicated by 26 in the drawings. Bolts 27 are provided which have heads 28 that bear against the shoulder 24 and the surface of the flange 16. These bolts 27 include shank portions 29 that are extended through the openings 25 and recesses 26. Wedging members 30 are provided which include openings 31 through which the shank portion 29 is extended. The portions of these wedging members disposed inwardly in the region of the opening 31, are hollowed out, as indicated at 32, and the inner wall portions 33 of these hollowed out portions 32 are tapered and when the wedging members 30 are disposed in locking position these tapered surfaces 33 act on the foot portion 34 of the portion 20. The portion in the region 35 of the section 12 is tapered and formed so that the surface of the portion 36 of the wedging members 30 will co-operate therewith and exert a wedging action at the same time the portions 33 are exerting a wedging action on the portion 34. The outer end portions of the shanks 29 are screw threaded as indicated at 37 in order that nuts 38 may be fitted thereon. Tightening of these nuts will tend to force the wedging members 30 toward the sections 11 and 12 and inasmuch as the heads 28 engage the section 11 on the shoulder 24 and since the legs 39 of the wedging members 30 engage the outer face of the shoulder portion 22 and since the surfaces 36 and 33 produce wedging actions in the manner set forth, it is apparent that this tightening of the nuts 38 will securely fasten the rim sections 11 and 12 together.

When this device is to be used as a rim, the above mentioned construction is securely locked on the felly of a wheel in any approved manner; it being understood that prior to the time the sections 11 and 12 are assembled that a suitable pneumatic tire will have been mounted on the section 11 and then the section 12 will have been positioned and by manipulating the fastening means, sections 11 and 12 will have been secured together so as to clamp the tire thereon. Therefore if any trouble develops in a pneumatic tire, the rim 10 will be removed from the felly of the wheel and the nuts 38 will be removed as well as the locking members 30. Section 12 will then be removed and the tire may be expeditiously removed from the remaining section 11.

It is apparent from the foregoing description that we have provided a rim construction which will permit the expeditions positioning of pneumatic tires thereon and removable therefrom.

While we have illustrated and described the preferred form of construction for carrying our invention into effect this is capable of variations and modifications without departing from the spirit of the invention. We, therefore, do not want to be limited to the precise details of construction set forth, but desire to avail ourselves of such variations and modifications as come within the scope of the appended claim.

Having thus described our invention what we claim as new and desire to protect by Letters Patent is as follows:

A rim comprising an inner ring section and an outer ring section, said inner ring section having flanges formed on the inner surface thereof providing shoulders having the surfaces thereof disposed toward said outer ring section formed to provide a step arrangement, said outer ring section having a co-operating step arrangement provided thereon, said inner ring section having openings extending transversely through the most inwardly disposed of the flanges thereof, said outer ring section having a flange member provided thereon adapted to extend across a shoulder provided on said first mentioned flange section, said second named section having recess portions formed therein adapted to register with said openings, bolt members adapted to extend through said openings and said recess portions having headed ends thereon adapted to be disposed in abutment with a shoulder provided by said first named flange and locking members having wedging surfaces thereon adapted to be disposed in abutment with the outer surface of said outer ring member and having wedging surfaces thereon adapted to force a portion on said inner ring section toward a portion of said outer ring section, said wedging members having openings therein adapted to receive said bolt members, and nut members adapted to be mounted on said bolt members whereby to draw said locking member into position so as to secure said outer ring section to said inner ring section.

In testimony whereof we hereby affix our signatures.

CHARLES J. RABIDOUX.
WILLIAM M. EINHORN.